US011171806B1

(12) United States Patent
Yocum et al.

(10) Patent No.: US 11,171,806 B1
(45) Date of Patent: Nov. 9, 2021

(54) DYNAMIC QUALITY OF SERVICE CONTROL FOR AUTOMOTIVE ETHERNET

(71) Applicant: GM GLOBAL TECHNOLOGY OPERATIONS LLC, Detroit, MI (US)

(72) Inventors: Michael G. Yocum, Rochester Hills, MI (US); Andrew Kryszak, Clawson, MI (US); William R. Price, Grand Blanc, MI (US); Steven Hartley, Pointe-Claire (CA); Robert H. Lake, East China, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/912,825

(22) Filed: Jun. 26, 2020

(51) Int. Cl.
*H04L 12/40* (2006.01)
*H04L 12/931* (2013.01)
*B60R 16/03* (2006.01)
*H04L 12/833* (2013.01)
*H04L 12/851* (2013.01)

(52) U.S. Cl.
CPC ........ *H04L 12/40143* (2013.01); *B60R 16/03* (2013.01); *H04L 47/2433* (2013.01); *H04L 47/2458* (2013.01); *H04L 49/351* (2013.01); *H04L 2012/40273* (2013.01)

(58) Field of Classification Search
CPC ........... H04L 12/40143; H04L 47/2433; H04L 47/2458; H04L 49/351; H04L 2012/40273; B60R 16/03
See application file for complete search history.

(56) References Cited

U.S. PATENT DOCUMENTS

| 6,920,135 | B1* | 7/2005 | Lea | H04L 49/1507 |
| | | | | 370/389 |
| 2005/0141501 | A1* | 6/2005 | Kadambi | H04L 12/467 |
| | | | | 370/389 |
| 2007/0143516 | A1* | 6/2007 | Sato | G06F 13/26 |
| | | | | 710/264 |
| 2008/0082703 | A1* | 4/2008 | Ueno | G06F 13/36 |
| | | | | 710/40 |
| 2017/0078208 | A1* | 3/2017 | Panin | H04L 47/24 |
| 2019/0319820 | A1* | 10/2019 | Ogawa | H04L 12/44 |
| 2020/0322830 | A1* | 10/2020 | Nagamura | H04W 28/0226 |

* cited by examiner

*Primary Examiner* — Kibrom T Hailu
(74) *Attorney, Agent, or Firm* — Harness, Dickey & Pierce, P.L.C.

(57) ABSTRACT

A system for transferring a frame within an Ethernet network of a vehicle. The system includes an Ethernet switch, first and second feature modules and a NAM. The Ethernet switch includes first and second ports connected respectively to the first and second feature modules. The NAM: receives a priority request message from the second feature module; generates a priority response message indicating information for the second feature module to set a priority level of a frame; and transmits the priority response message to the second feature module. The Ethernet switch: receives the frame from the second feature module at the first port, where the frame has a first bit indicative of the priority level and a second bit indicative of a port of the first feature module; and forwards the frame, based on the first and second bits, to a corresponding one of the queues having the priority level and for transmission to the port of the first feature module.

22 Claims, 13 Drawing Sheets

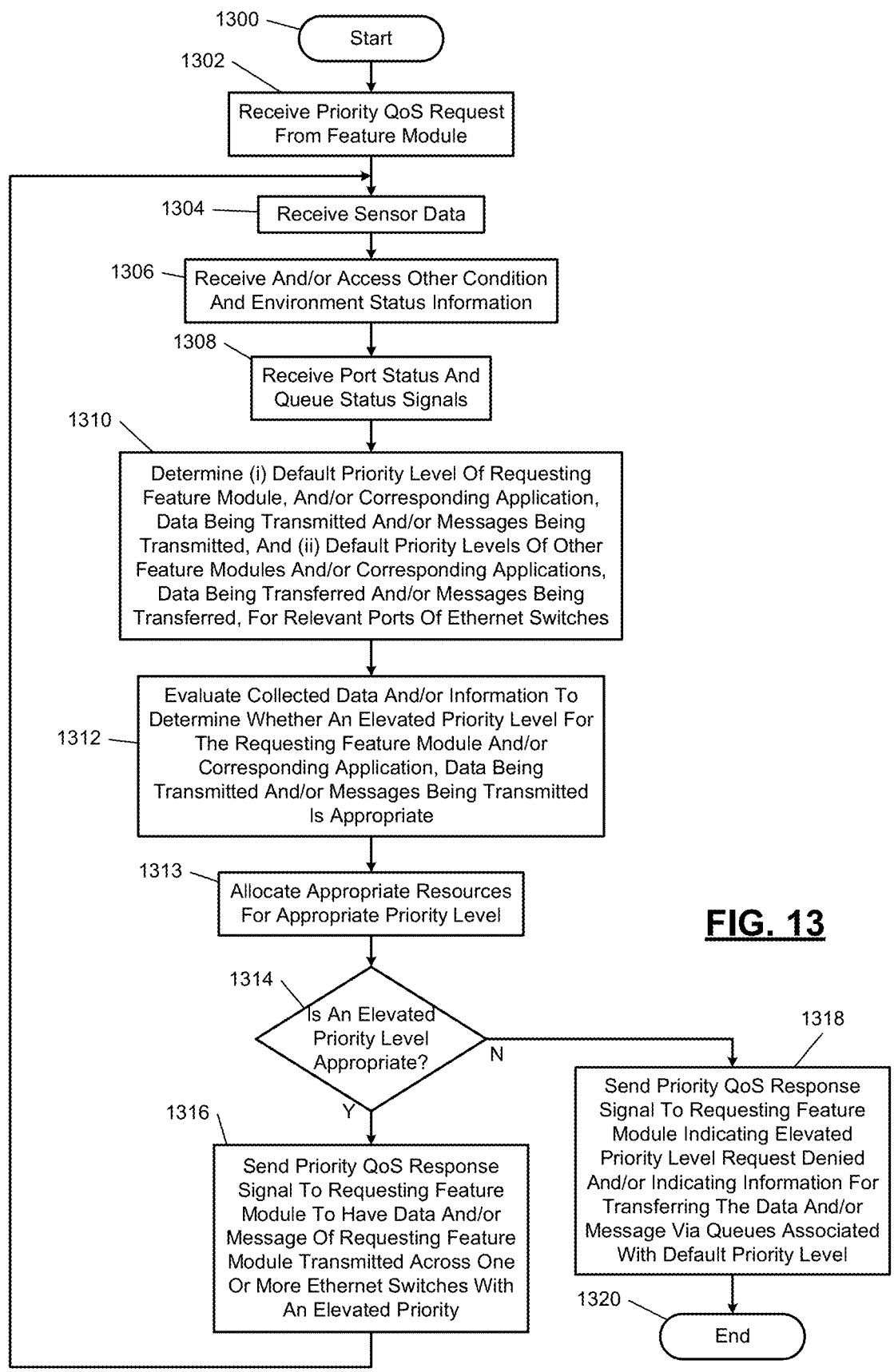

DYNAMIC QUALITY OF SERVICE CONTROL FOR AUTOMOTIVE ETHERNET

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to in-vehicle Ethernet networks.

An electric vehicle uses one or more electric motors for propulsion. The electric motors may be powered by batteries, solar panels, generators, etc. An electric automobile may include numerous onboard electrical vehicle systems and components performing various operations associated with corresponding features. The features may include hands-free driving assistance, vehicle-to-vehicle communication, anti-lock braking, wireless communication, Internet access, navigation, global positioning, and/or other features. The features can be at least partially implemented as applications executed by corresponding modules. The modules can be connected to each other via Ethernet switches as part of an Ethernet network.

SUMMARY

A system for transferring a frame within an Ethernet network of a vehicle. The system includes an Ethernet switch, a first feature module, a second feature module and a network access module. The Ethernet switch includes ports. The ports include a first port and a second port. The first port includes queues. The first feature module is connected to the first port. The second feature module is connected to the second port. The network access module is implemented at the Ethernet switch, the first feature module or the second feature module. The network access module is configured to: receive a priority request message from the second feature module; generate a priority response message indicating information for the second feature module to set a priority level of a frame; and transmit the priority response message to the second feature module. The Ethernet switch is configured to: receive the frame from the second feature module at the first port, where the frame has a first one or more bits indicative of the priority level and a second one or more bits indicative of a port of the first feature module; and forward the frame, based on the one or more bits, to a corresponding one of the queues having the priority level and for transmission to the port of the first feature module.

In other features, the network access module is configured to determine a type of the frame and changes the priority level of the frame based on at least one of a traffic level of data in the first port or a fill level of one or more of the queues.

In other features, the network access module is configured to determine a type of the frame and changes the priority level of the frame based on a business criterion.

In other features, the network access module is configured to determine a type of the frame and changes a priority level of the frame based on at least one of a vehicle condition or an operating environment of the vehicle.

In other features, a system for transferring a frame within an Ethernet network of a vehicle is provided. The system includes an Ethernet switch, a first feature module, a second feature module, and a network access module. The Ethernet switch includes ports. The ports include a first port and a second port. The first port includes queues. The first feature module is connected to the first port. The second feature module is connected to the second port. The network access module is separate from the Ethernet switch, the first feature module and the second feature module and configured to: receive a priority request message from the second feature module in the vehicle; generate a priority response message indicating information for the second feature module to set a priority level of a frame; and transmit the priority response message to the second feature module. The Ethernet switch is configured to: receive the frame from the second feature module at the first port, where the frame has a first one or more bits indicative of the priority level and a second one or more bits indicative of a port of the first feature module; and forward the frame, based on the first one or more bits and the second one or more bits, to a corresponding one of the queues having the priority level and for transmission to the port of the first feature module.

In other features, the network access module is configured to determine a type of the frame and changes the priority level of the frame based on a traffic level of data in the first port.

In other features, the network access module is configured to determine a type of the frame and changes the priority level of the frame based on a fill level of one or more of the queues.

In other features, the network access module is configured to determine a type of the frame and changes the priority level of the frame based on a business criterion.

In other features, the network access module is configured to determine a type of the frame and changes a priority level of the frame based on at least one of a vehicle condition or an operating environment of the vehicle.

In other features, the Ethernet switch includes a third port and the network access module is connected to the third port.

In other features, the network access module is implemented by the first feature module, the second feature module or the Ethernet switch.

In other features, a system for transferring a frame within an Ethernet network of a vehicle is provided. The system includes a first Ethernet switch, a second Ethernet switch, a first feature module and network access module. The first Ethernet switch includes ports. The ports include a first port and a second port, where the first port include queues. The second Ethernet switch is connected to the first port. The first feature module is connected to the second port or the second Ethernet switch. The network access module is configured to: receive a priority request message from the first feature module within the vehicle; generate a priority response message indicating information for the first feature module to set a priority level of the frame; and transmit the priority response message to the first feature module. The first Ethernet switch is configured to: receive the frame from the first feature module at the first port, where the frame has a first one or more bits indicative of the priority level and a second one or more bits indicative of a port of a second feature module; and forward the frame, based on the first one or more bits and the second one or more bits, to a corresponding one of the queues having the priority level and for transmission to the port of the second feature module.

In other features, the network access module configured to determine a type of the frame and changes the priority level of the frame based on a traffic level of data in the first port.

In other features, the network access module is configured to determine a type of the frame and changes the priority level of the frame based on a fill level of one or more of the queues.

In other features, the network access module is configured to determine a type of the frame and changes the priority level of the frame based on a business criterion.

In other features, the network access module is configured to determine a type of the frame and changes a priority level of the frame based on at least one of a vehicle condition or an operating environment of the vehicle.

In other features, the first feature module is connected to the second port. The port of the second feature module is a port of the second Ethernet switch.

In other features, the first feature module is connected to the second Ethernet switch. The port of the second feature module is a port of the first Ethernet switch.

In other features, the first Ethernet switch includes a third port. The network access module is connected to the third port.

In other features, the network access module is implemented by the first feature module, the second feature module, the first Ethernet switch or the second Ethernet switch.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 13 illustrates an example dynamic prioritization and resource allocation method including a method of operating a network access module in accordance with the present disclosure.

In the drawings, reference numbers may be reused to identify similar and/or identical elements.

DETAILED DESCRIPTION

A single automotive vehicle can have multiple Ethernet switches serving numerous modules. Each of the Ethernet switches may include multiple ports, where each port may include multiple input and output queues for storing and transferring data between the ports. Each Ethernet switch may be connected to one or more modules and one or more other Ethernet switches and transfer data between the modules and the other Ethernet switches.

Traditionally, quality of service implementations are static meaning prioritization of vehicular Ethernet traffic is set statically, such that each type of traffic has a fixed corresponding prioritization level. Operations associated with the different types of traffic are performed in a predetermined order corresponding to the priority level ranking of the types of traffic. As an example, a controller may: receive first data and second data; determine the types of the first data and the second data (e.g., safety related data, communication data, climate control data, etc.); based on the types, determine priority levels of the first data and second data; and based on the priority levels and the corresponding predetermined order in which operations are to be performed, permit performing operations associated with the data having the higher priority level prior to performing operations associated with the other data.

The examples set forth herein include dynamically prioritizing operations and allocating resources within an Ethernet network of a vehicle for quality of service (QoS) management of the Ethernet network. Vehicle events and corresponding data may be prioritized as the vehicle events occur. The examples include dynamically prioritizing Ethernet messages based on vehicle conditions, data traffic conditions, a predetermined default prioritization ranking of data types, predetermined criteria, fill levels of Ethernet port queues, and/or other criteria and status information referred to herein.

Figure 1:
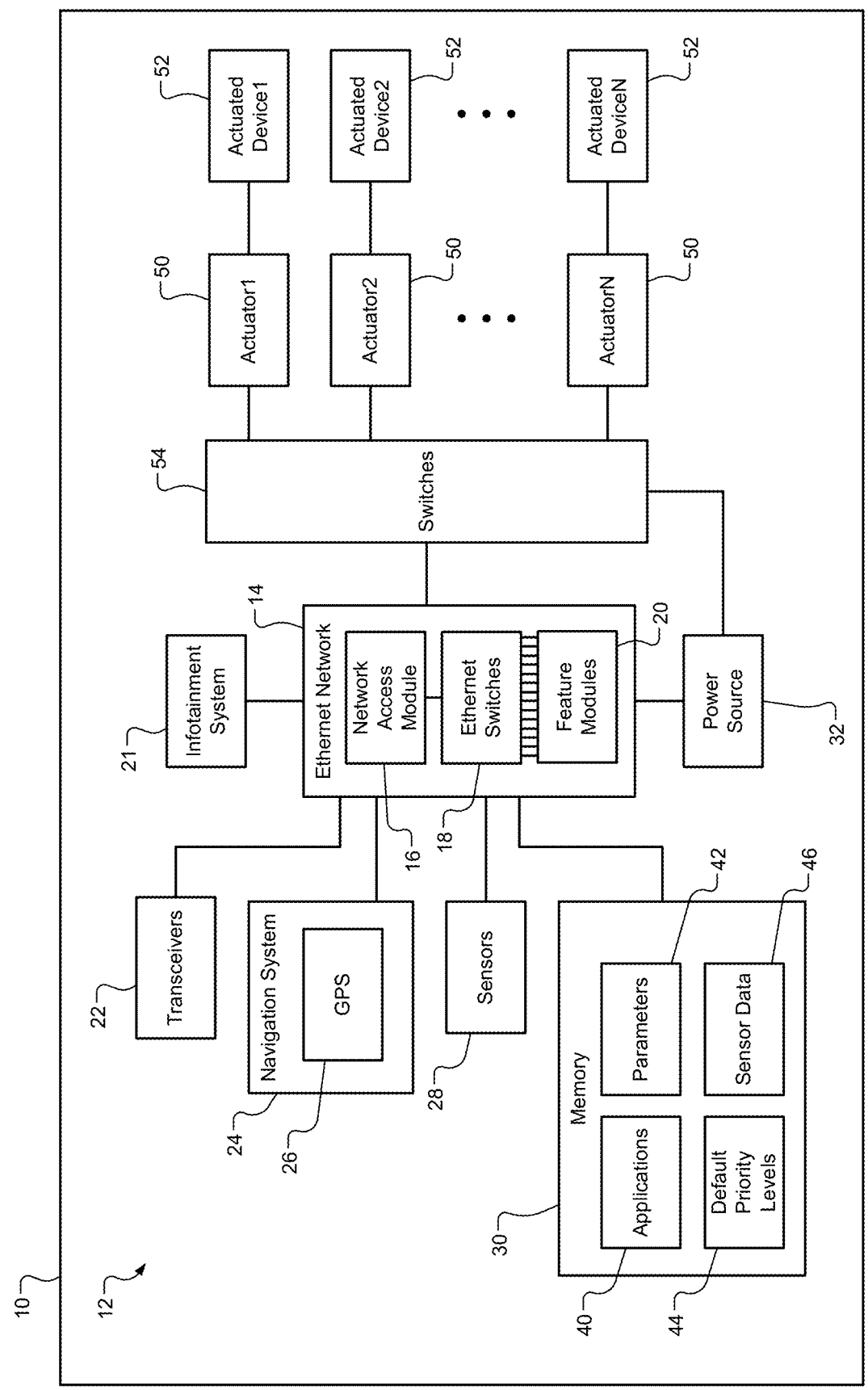
FIG. 1 is a functional block diagram of a vehicle including a vehicle system incorporating an example Ethernet network with a network access module in accordance with the present disclosure.

FIG. 1 shows a vehicle 10 including a vehicle system 12 incorporating an Ethernet network 14. The vehicle 10 may be an electric vehicle or other type of vehicle (e.g., a hybrid vehicle, a vehicle including an internal combustion engine, etc.). The Ethernet network 14 includes a network access module 16, Ethernet switches 18 and feature modules 20. The network access (or central priority) module 16 implements dynamic prioritization of operations and determines allocation of resources based on that prioritization. The Ethernet switches transfer (i) messages including QoS requests and responses between the network access module (NAM) 16 and the feature modules, (ii) frames and/or data between feature modules, and (iii) frames and/or data between feature modules and devices. The feature modules may include applications executed by one or modules. For example only, the applications may include hands-free driving assistance, vehicle-to-vehicle communication, anti-lock braking, wireless communication, Internet access, navigation, global positioning, infotainment, climate control, safety system applications, and/or other applications. In addition to be connected to feature modules, the Ethernet switches 18 may be connected to various devices, some of which are referred to herein and include sensors, transceivers, operating system devices, memory, switches, etc. Operations of the NAM 16, the Ethernet switches 18 and the feature modules 20 are further described below with respect to the examples of FIGS. 2-13. As an example, the NAM 16 may control prioritization of off-board data (or traffic) from an infotainment feature module of an infotainment system to and/or from the Internet via a transceiver, where the infotainment feature module and the transceiver are connected to ports of the Ethernet switches. Other examples are disclosed herein.

The vehicle system 12 may further include an infotainment system 21, transceivers 22, a navigation system 24 with a global positioning system (GPS) 26, sensors 28, memory 30 and a power source 32. The infotainment system 21 may include audio and video devices, such as speakers and displays (or screens). The transceivers 22 may be used to wirelessly communicate with and/or receive signals from remotely located: vehicles; base stations; satellites; edge servers and/or nodes for edge computing services; etc. The sensors 28 may include object detection sensors (e.g., radar sensors and cameras), temperature sensors, flow rate sensors, pressure sensors, speed sensors, etc. The memory 30 may store applications 40, such as the applications executed by the feature modules 20, parameters 42, default priority levels 44, sensor data 46, and/or other data and information referred to herein.

The power source 32 may provide power to the Ethernet network 14 and/or other devices of the vehicle system 12. As an example, the power source 32 may be a battery bank and provide power to actuators 50 to actuate actuated devices 52. The power may be provided via switches 54, which may be controlled by the feature modules 20 via the Ethernet switches 18. The actuators 50 may include motors, solenoids, and/or other actuators. The actuated devices 52 may include valves, locks, windows, fans, etc.

Figure 2:
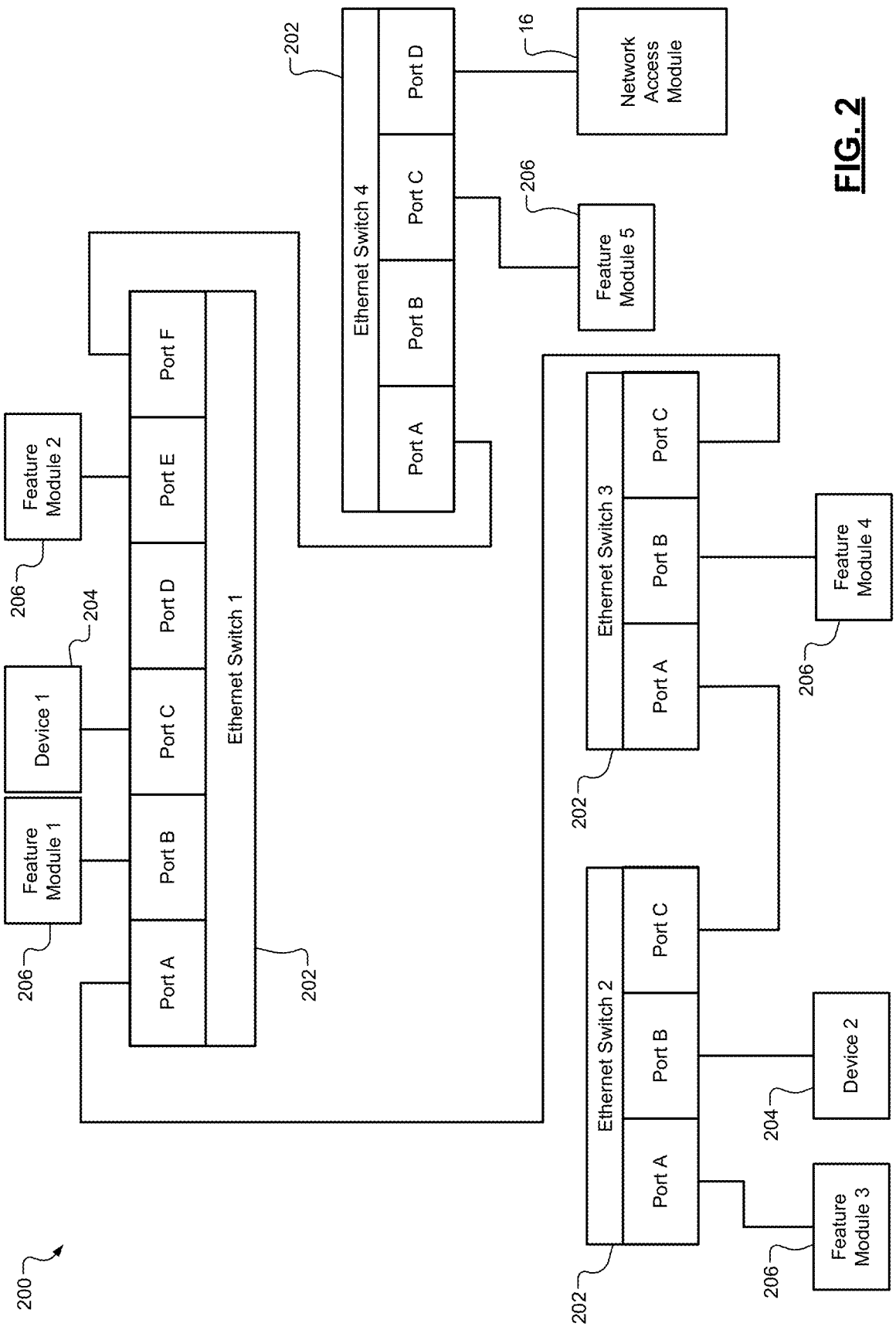
FIG. 2 is a functional block diagram of an example of the Ethernet network of FIG. 1.

FIG. 2 shows an Ethernet network 200, which is an example of the Ethernet network 14 of FIG. 1. The Ethernet network 200 includes Ethernet switches 202 having ports (identified as A-F). The Ethernet network 200 may include any number of Ethernet switches and each of the Ethernet switches 202 may include any number of ports. The Ethernet switches 202 may operate according to Ethernet protocols. Each of the ports may be connected to a device or a feature module. Example devices 204 and feature modules 206 are shown. The devices 204 may be any of the above stated devices. The feature modules 206 may include the feature modules 20 of FIG. 1. Some of the ports may be used to connect two or more of the Ethernet switches. As an example, the feature module 3 may transfer frames to the feature module 5 via the Ethernet switches 1-4.

The NAM 16 may be connected to one of the ports as shown. In another embodiment, the NAM 16 is implemented as part of one of the Ethernet switches 202 or as part of one of the feature modules 206. In another embodiment, multiple versions of the NAM 16 are implemented at various locations in the Ethernet network 200. As an example, one or more of the Ethernet switches 202 and/or one or more of the feature modules 206 may implement operations of the NAM 16, as described herein. Further NAM operations are described below.

Figure 3:
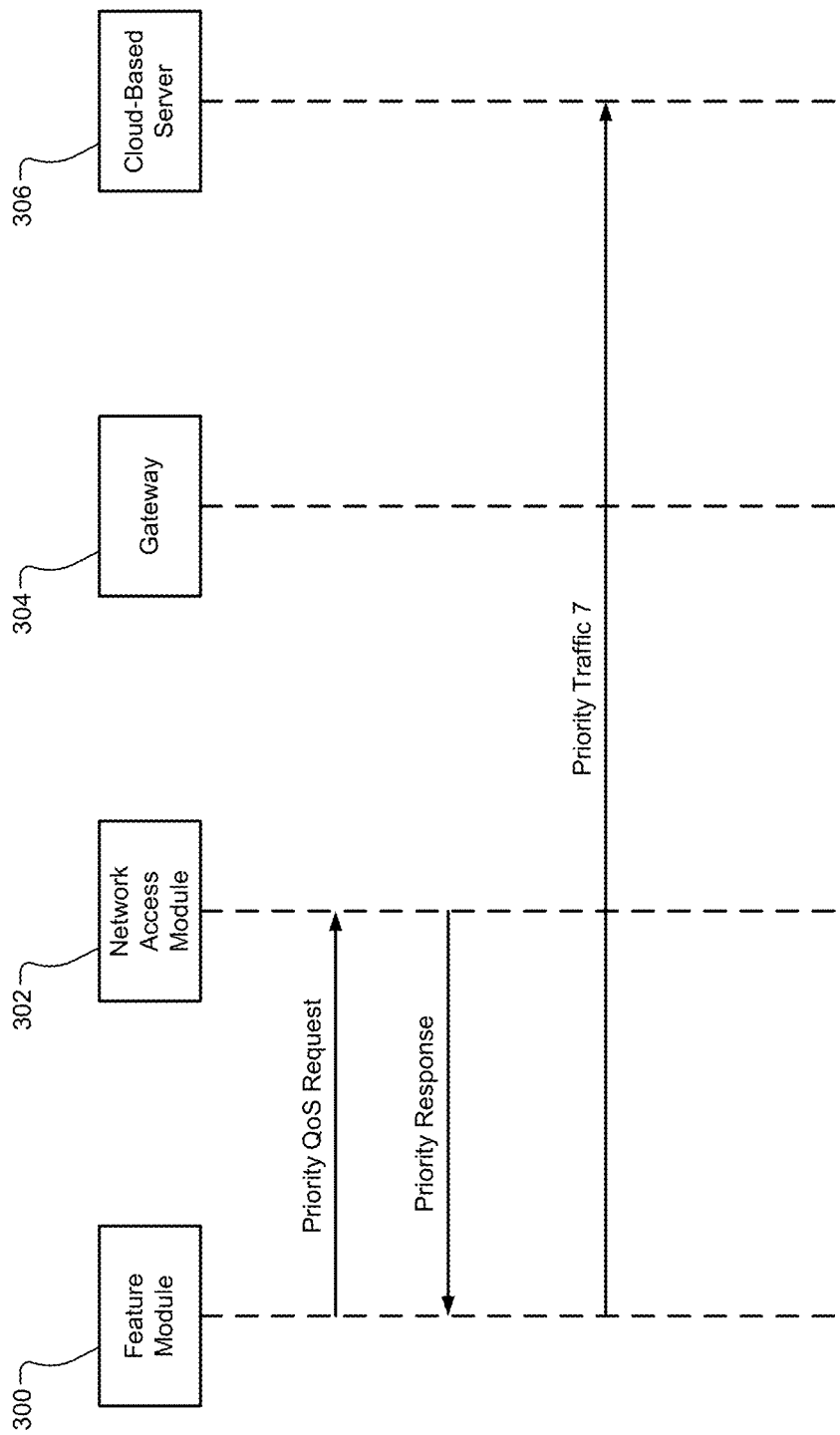
FIG. 3 is an example signal diagram illustrating a dynamic priority request and resource allocation assignment in accordance with the present disclosure.

FIG. 3 shows a signal diagram illustrating a dynamic priority request and resource allocation. In FIG. 3, a feature module 300, a network access module 302, a gateway 304 and a cloud-based server 306 are shown. The feature module 300 may refer to any feature module disclosed herein and generates a priority QoS request message, which is sent to the NAM 302. The priority QoS request may include a feature module identifier, an application identifier, a device identifier, a destination feature module identifier, a frame type, a data type, and/or other identification information. In one embodiment, the priority QoS request may include a differentiated services code point (SSCP), which is a header value that can be used to request a high priority level and/or a best route for sending data. The transmission of the priority QoS request may in and of itself be an indication of requesting increased priority or may include an indicator indicating a request for increased priority. As an example, data and/or frames transmitted and/or received by the feature module 300 may have a default priority level associated with queues of a port of an Ethernet switch connected to the feature module 300.

Figure 4:
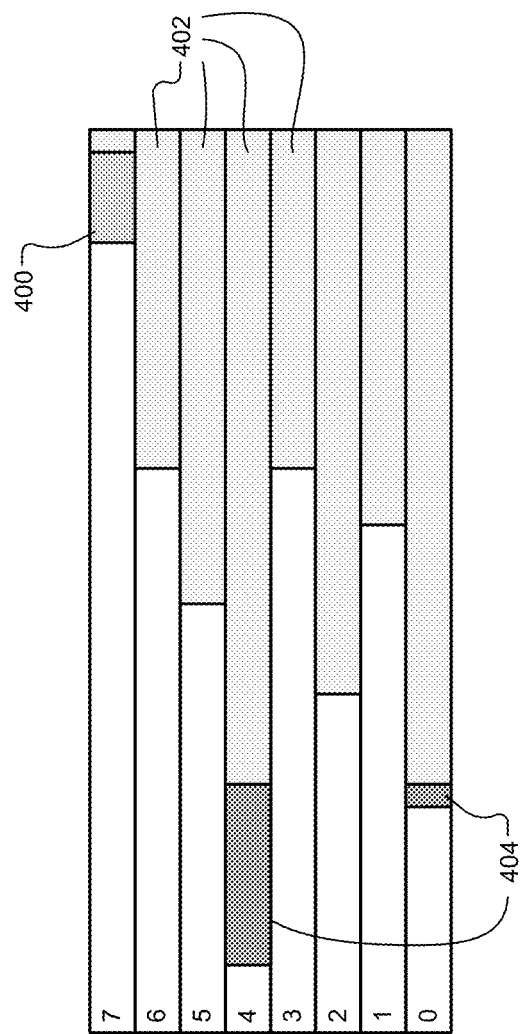
FIG. 4 is a functional block diagram of example queues of a port having respective priority levels and fill levels in accordance with the present disclosure.

FIG. 4 shows an example of 8 queues identified as queues 0-7, wherein queue 0 has the lowest priority level and queue 7 has the highest priority level. The higher the number of the queue, the higher the priority level and the sooner the corresponding frames are transmitted. Data stored in a higher priority level queue is transferred prior to data stored in a lower priority level queue. In FIG. 4 frames being transferred to different feature modules and/or devices have different shading. Three different shades 400, 402, 404 are shown. The same feature module may allocate different priority levels at different times, for frames being transmitted to different endpoint feature modules and/or devices, and/or for frames of different types. An endpoint feature module and an endpoint device refer to a final (or target) destination feature module and a final (or target) destination device receiving a transmitted frame. In FIG. 4, each of the queues 0-7 may have different fill levels. In the example shown, queue 4 has the highest fill level and queue 7 has the lowest queue level. The fill levels of the queues fluctuate depending on the amount of data being transmitted for each priority level at any given moment in time.

By transmitting the priority QoS request, a higher priority level is requested and/or granted. This is further described below. The NAM 302 responds with a priority response message. The priority response message may indicate whether the priority level for the feature module 300 has been increased or whether the request has been denied. The priority response message may include information to set priority correctly for frames transmitted by the feature module 300 including a priority level indicator, the one or more queue identifiers, and/or destination addresses. The feature module 300 may then transmit frames with headers indicating, for example, the priority level indicator, the one or more queue identifiers, and/or the one or more destination address. The frames may be transferred to and stored in the identified queue, such as one of the queues of FIG. 4, prior to being transmitted to the appropriate device and/or feature module via one or more Ethernet switches. The priority response message and/or the headers may further include Ethernet switch identifiers and/or Ethernet switch port identifiers. In the example, shown a priority level increase is granted, and the feature module 300 transmits frames to queue 7, which are transmitted to the cloud-based server 306 via the gateway 304. The transmitted frames may not be received at and/or pass through the NAM 302.

Figure 5:
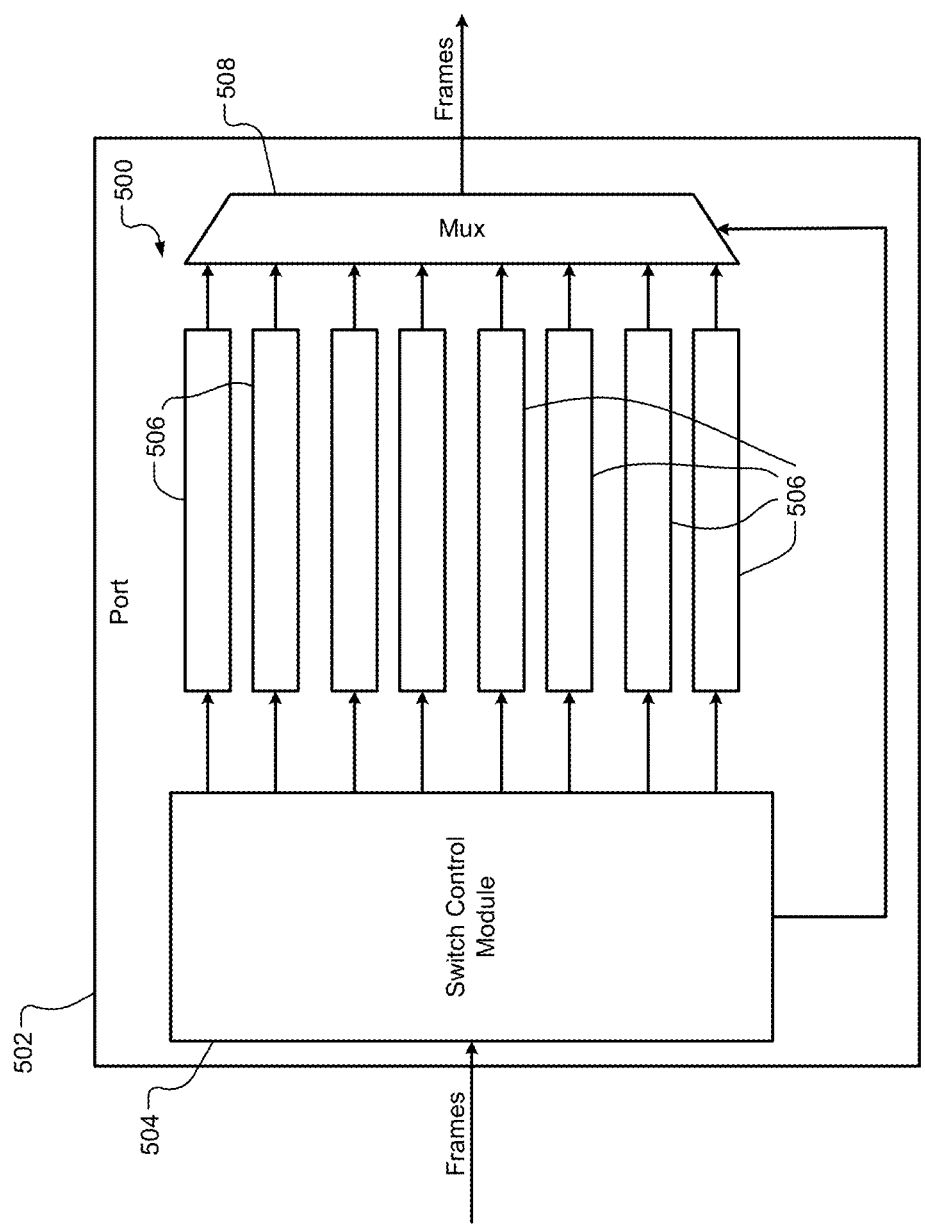
FIG. 5 is a functional block diagram of an example of a portion of a port including a switch control module and queues in accordance with the present disclosure.

FIG. 5 shows a portion 500 of a port 502 including a switch control module 504, queues 506 and a multiplexer 508. The port 502 may be an example of any of the ports shown in FIG. 2. The switch control module 504 may receive frames from, for example, a feature module indicating any of the priority response message information stated above and store the frames in the appropriate one of the queues 506. The switch control module 504 may control transmission of frames stored in the queues by signaling the multiplexer 508, which selects one of the queues 506 at any moment in time.

Figure 6:
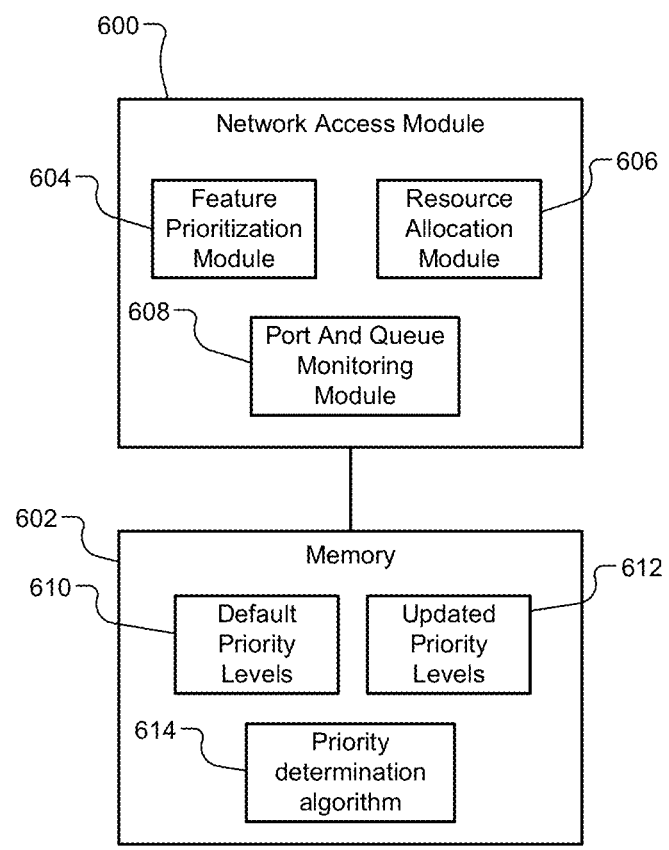
FIG. 6 is a functional block diagram of an example of a network access module in accordance with the present disclosure.

FIG. 6 shows a NAM 600, which may refer to any of the NAMs disclosed herein. The NAM 600 may be connected to a memory 602 as shown or include the memory 602. The NAM 600 may include a feature prioritization module 604, a resource allocation module 606 and a port and queue monitoring module 608. The feature prioritization module 604 may determine priority levels of applications, data, frames at any instance in time based on vehicle conditions and operating environments. As an example, frames associated with performing safety related operations may in general have a higher priority level than other operations. Elevated priority levels may be temporarily provided and then returned to default priority levels. The resource allocation module 606 may allocate resources based on the currently assigned priority levels. This may include, for example, allocating queues of ports to feature modules based on the determined priority levels. The port and queue monitoring module 608 may continuously monitor fill level and transmission rates of queues and ports of Ethernet switches to determine queue fill levels and availabilities and port traffic levels. This allows for the resource allocation module 606 to allocate resources in an efficient manner such that frame transfer rates are maximized and application hold times (or delay periods) are minimized.

The memory 602 may store default priority levels 610, updated priority levels 612 and/or a priority determination algorithm 614. The default priority levels 610 may be priority levels of queues of ports for each feature module and/or application being executed. The updated priority levels 612 may include priority levels that have at least temporarily been changed due to priority QoS requests. The priority determination algorithm may be implemented by the feature prioritization module 604. The algorithm may include use of tables, equations, decision trees, etc. for determining priority levels of the resources, such as port queues.

Figure 7:
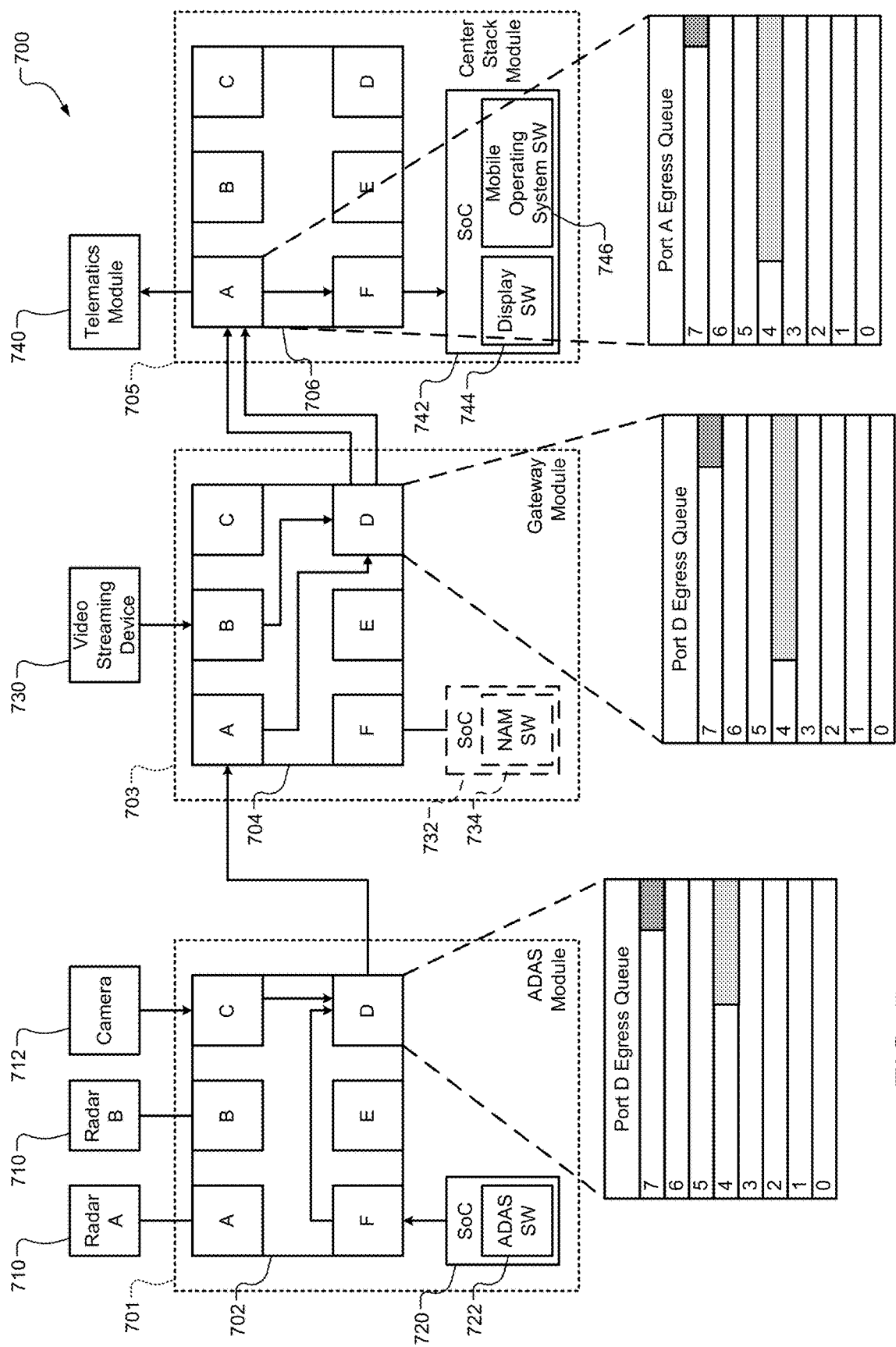
FIG. 7 is a functional block diagram of an Ethernet network illustrating transmission of frames for a distributed contention example according to a traditional method of resource allocation.

FIG. 7 shows a distributed contention example of an Ethernet network 700, which includes an advanced driver assistance system (ADAS) module 701, a gateway module 703 and a center stack module 705 including respectively Ethernet switches 702, 704, 706. Each of the Ethernet switches 702, 704, 706 includes corresponding ports A-F. Each of the ports A-F includes a set of queues. Example sets of queues are shown for ports D, D and A respectively of Ethernet switches 702, 704, 706.

The ports A-F may be connected to various devices and feature modules, some examples of which are shown. The ports A-C of Ethernet switch 702 are connected to radar sensors 710 and camera 712. Port D of Ethernet switch 702 is connected to port A of Ethernet switch 704. Port F of Ethernet switch 702 is connected to a system-on-chip (SoC) 720 executing ADAS software (SW) 722.

Port B of the Ethernet switch 704 is connected to a video streaming device 730. Port D of the Ethernet switch 704 is connected to port A of the Ethernet switch 706. Port F of the Ethernet switch 704 is connected to a SoC 732, which is executing NAM software 734. The SoC 732 may perform as a NAM, as described herein. Port A of the Ethernet switch 706 is connected to a telematics module 740. Port F of the Ethernet switch 706 is connected to a SoC 742, which implements display software 744 and mobile operating system software 746. The devices 740, 742 may be referred to as endpoint devices (or simply endpoints).

In the example shown, the SoC 720 may stream data received from the camera 712 to a display in or connected to the SoC 742 or a port of the Ethernet switch 706. The display may be a display of an infotainment system, a display located in a center console, a display on a mobile access device (e.g., a cellular phone, a wearable device, a tablet, etc.). The mobile operating system software may include, for example, Android®, iOS®, Windows®, and/or other operating system software. In addition, the video streaming device 730 may transfer video data to the telematics module 740 for streaming through the telematics module 740. Port D of Ethernet switch 704 and Port A of Ethernet switch 706 may be in contention, meaning the data from both of the SoC 720 and the video streaming device 730 has been provided and is to pass through these ports, as shown. The data with the higher priority level is transferred prior to the data with the lower priority level. As an example, the SoC 720 may normally have a lower priority level (e.g., level 4 associated with queue 4) than the video streaming device 730, which may have a priority level 7 associated with queue 7). As a result, the data from the video streaming device 730 may be stored in higher priority level queues and passed through ports D and A of the Ethernet switches 704, 706 sooner than the data from the camera 712 and/or SoC 720. The SoC 732 may not be involved in the above transfer process or may simply be involved to provide default priority level information.

Figure 8:
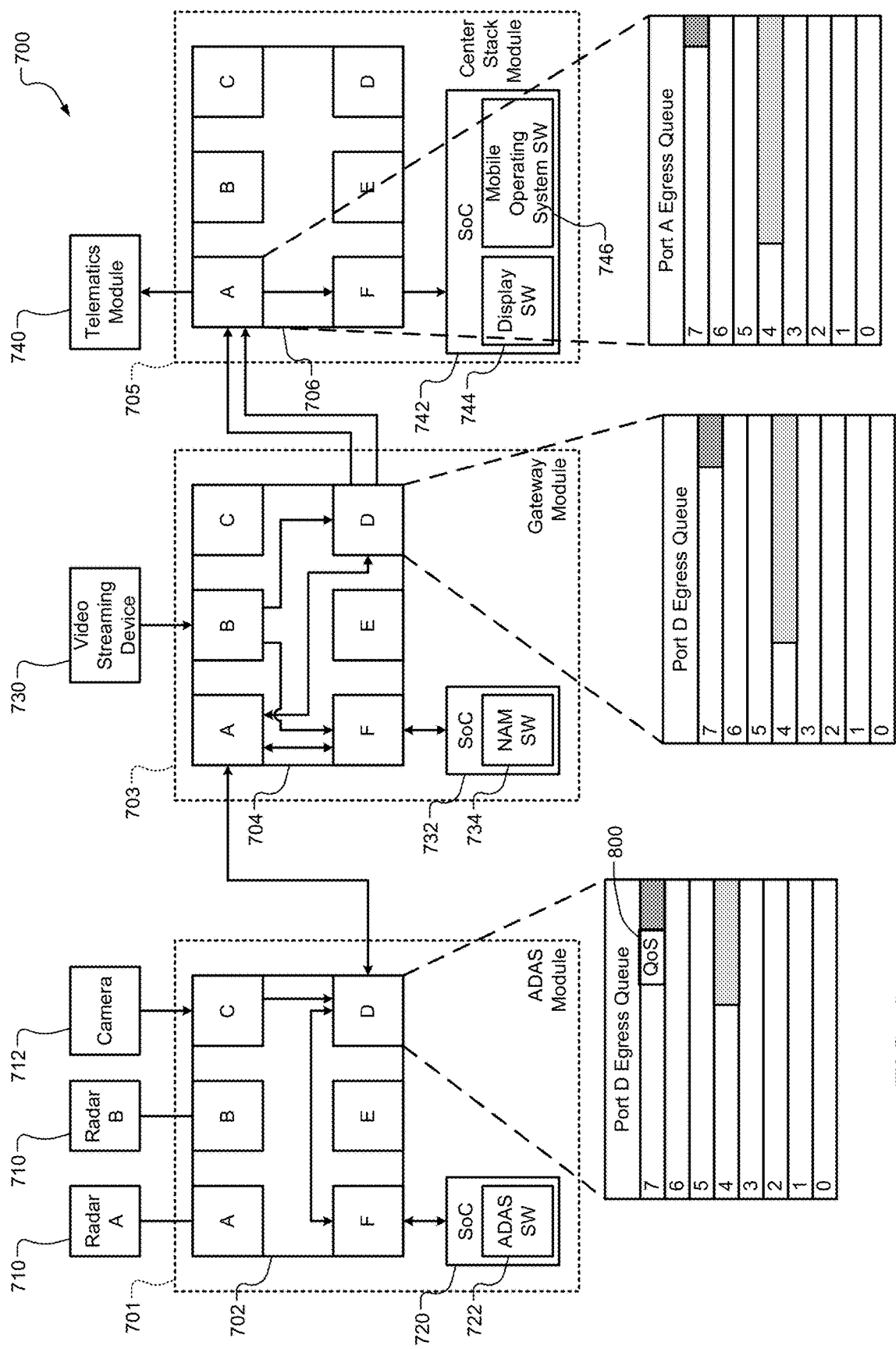
FIG. 8 is a functional block diagram of the Ethernet network of FIG. 7 illustrating transmission of a quality of service request for a distributed contention example in accordance with the present disclosure.

FIG. 8 shows a distributed contention example of the Ethernet network 700 including the modules 701, 703, 705, Ethernet switches 702, 704, 706, devices 710, 712, 720, 730, 732, 740 and 742 and software 722, 734, 744, and 746. The ports of the Ethernet switches 702, 704, 706 include respective sets of queues.

According to the example disclosed herein, the SoC 720 (or first feature module), in an attempt to obtain a higher priority level, may send a priority QoS request message (or priority elevation request) 800 to the SoC 732 (or NAM module). The priority QoS request message 800 may have a highest level priority (e.g., level 7) or other elevated predetermined level as compared to the default priority level of the SoC 720. The SoC 720 may return to the default priority level after sending the priority QoS request message 800. This may be implemented while executing the ADAS software 722.

The SoC 732 may determine whether it is appropriate under current vehicle conditions and operating environment to grant a higher priority level to the SoC 720 and/or data being transmitted from the camera 712 and/or SoC 720. The higher priority level may be the same or higher than the priority level associated with the data being sent from the video streaming device 730. When the vehicle conditions, operating environment, data type and/or importance level changes, the higher priority level may be reduced to a lower or default priority level. As an example, the priority level associated with the SoC 720 may be increased from 4 to 7 and then later reduced back to 4. If the same priority level is granted for both the SoC 720 and the video streaming device 730, then flow through the same assigned queue may be according to a first in first out format. The SoC 732 may also monitor data traffic levels and queue fill levels of the port D of the Ethernet switch 704 and port A of the Ethernet switch 706. The granting of the SoC 720 to a higher priority level and/or the allocating of the queue to the SoC 720 may be based on these monitored levels.

Figure 9:
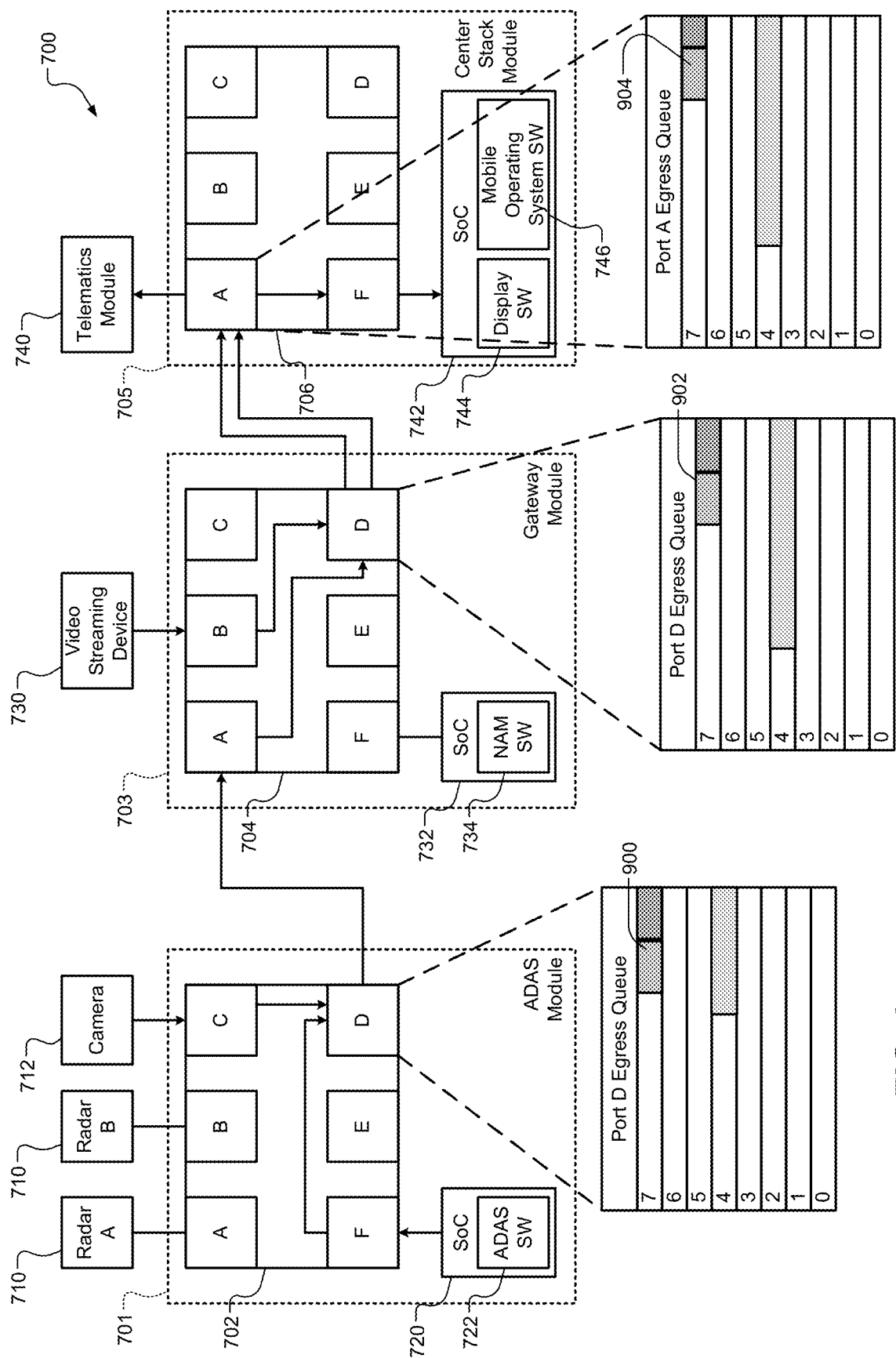
FIG. 9 is a functional block diagram of the Ethernet network of FIG. 7 illustrating transmission of frames for of the distributed contention example based on the quality of service request and in accordance with the present disclosure.

Continuing with the example of FIG. 8, FIG. 9 shows the Ethernet network 700 including the modules 701, 703, 705, Ethernet switches 702, 704, 706, devices 710, 712, 720, 730, 732, 740 and 742 and software 722, 734, 744, and 746. The ports of the Ethernet switches 702, 704, 706 include respective sets of queues. The SoC 732 (or NAM module) grants an elevated priority level to the SoC 720, which results in at least some of the data from the camera 712 and/or from the SoC 720 being stored in 7th level queues, as represented by data bars 900, 902, 904 prior to being transferred to the SoC 742. As a result, the data associated with the SoC 720 is transmitted to the SoC 742 quicker than using the traditional default priority level approach. The transferred data is not delayed by other data stored in level 4, 5, and 6 queues. Using the traditional default priority level approach, the transferred data would be delayed by other data stored in level 4, 5, and 6 queues in additional to being delayed by data stored in level 7 queues. As another example, the SoC 720 may have an important message to send to the SoC 742. By using the priority QoS approach described with respect to FIGS. 8-9, the amount of time to transfer the important message is greatly reduced.

Figure 10:
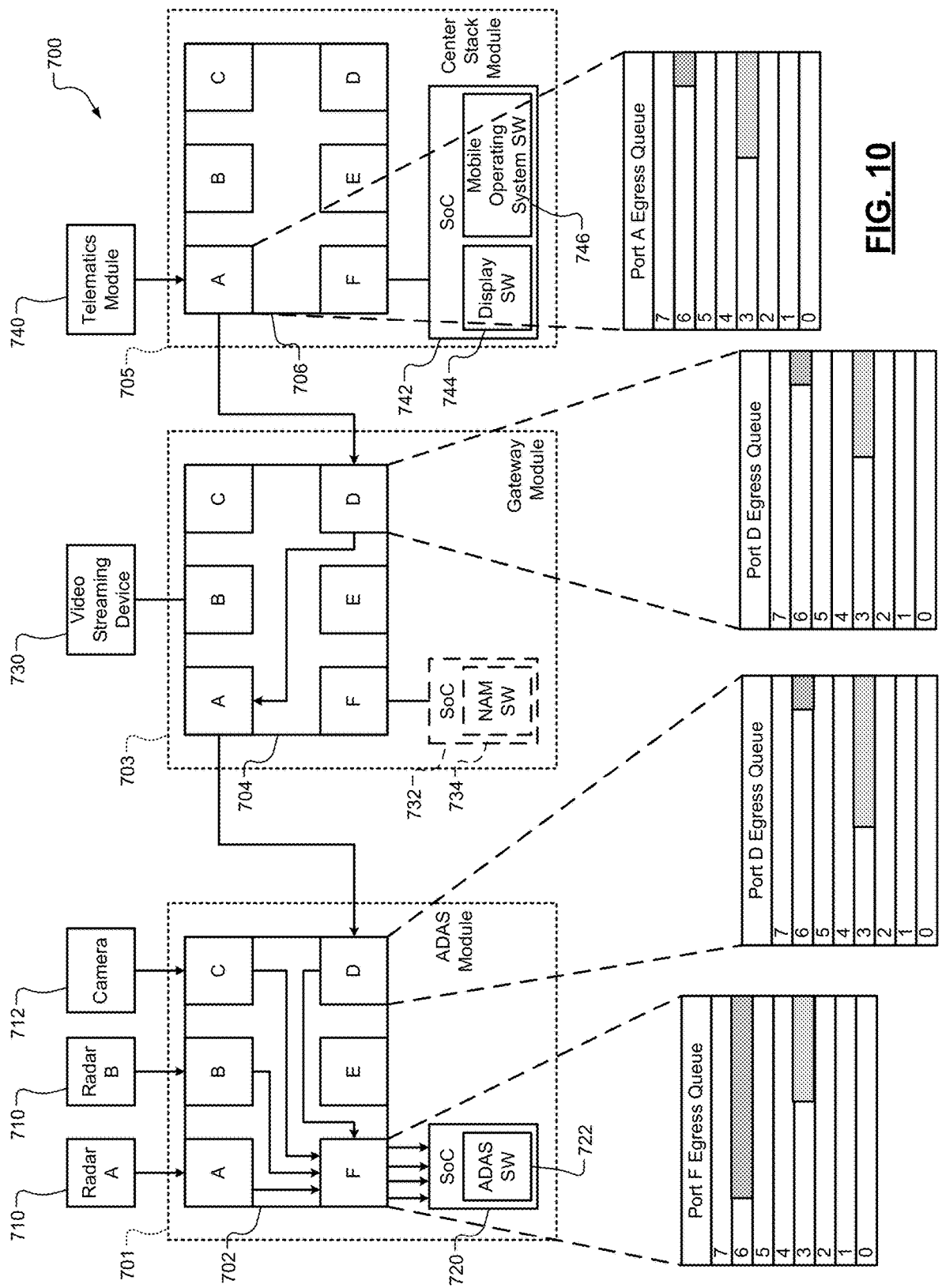
FIG. 10 is a functional block diagram of the Ethernet network of FIG. 7 illustrating transmission of frames for an endpoint contention example according to a traditional method.

FIG. 10 shows an endpoint contention example of the Ethernet network 700 including the modules 701, 703, 705, Ethernet switches 702, 704, 706, devices 710, 712, 720, 730, 732, 740 and 742 and software 722, 734, 744, and 746. The ports of the Ethernet switches 702, 704, 706 include respective sets of queues. The SoC 720 and the telematics module 740 may be referred to as feature modules and may have different associated priority levels and use different queues of a same port. For example, the telematics module 740 may have a priority level 3 and use queue 3 of the port F of the Ethernet switch 702 to send map updates to the SoC 720. The sensors 710, 712 may have a priority level of 6 and use queue 6 of the port F to send sensor data to the SoC 720. Thus, the sensor data is transmitted to the SoC 720 prior to the map updates.

Figure 11:
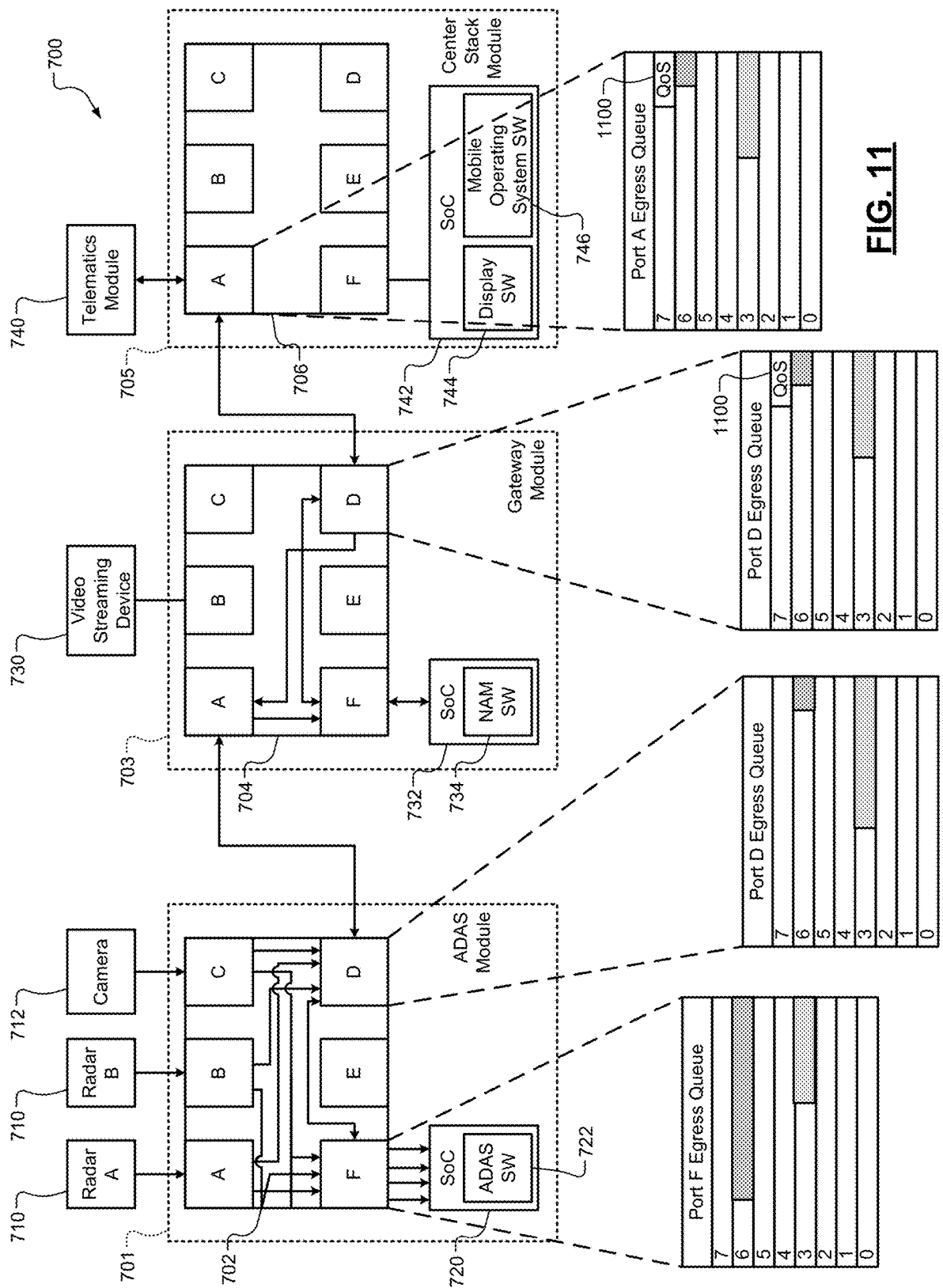
FIG. 11 is a functional block diagram of the Ethernet network of FIG. 7 illustrating transmission of a quality of service request for an endpoint contention example in accordance with the present disclosure.

FIG. 11 shows an endpoint contention example of the Ethernet network 700 including the modules 701, 703, 705, Ethernet switches 702, 704, 706, devices 710, 712, 720, 730, 732, 740 and 742 and software 722, 734, 744, and 746. The ports of the Ethernet switches 702, 704, 706 include respective sets of queues. In this example, the SoC 720 and the telematics module 740 are using different queues by default as described above with respect to FIG. 10 and one of the SoC 720 and the telematics module 740 requests priority elevation to share a queue used by the other one of the SoC 720 and the telematics module 740.

As an example, the telematics module 740 may determine that a region change has occurred and a new map ought to be sent with high priority to the SoC 720. The telematics module 740 sends a priority QoS request message 1100 to the SoC 732 to request priority level elevation for the telematics module 740. While this is occurring the sensors 710, 712 may be sending data to queue 3 of port F of the Ethernet switch 702. The sensors 710, 712 may be sending more data than usual because of a complex situation (e.g., city driving situation). The priority QoS request message 1100 may have a highest level priority (e.g., level 7) or other elevated predetermined level as compared to the default priority level of the telematics module 740. The telematics module 740 may return to the default priority level after sending the priority QoS request message 1100.

Due to the complex situation, the SoC 732 while executing the NAM software 734 determines that the data from the sensors 710, 712 is a higher priority than the new map data and as a result denies the request and/or maintains the priority level of the telematics module 740 at a level that is less than the priority level of the sensors 710, 712.

Figure 12:
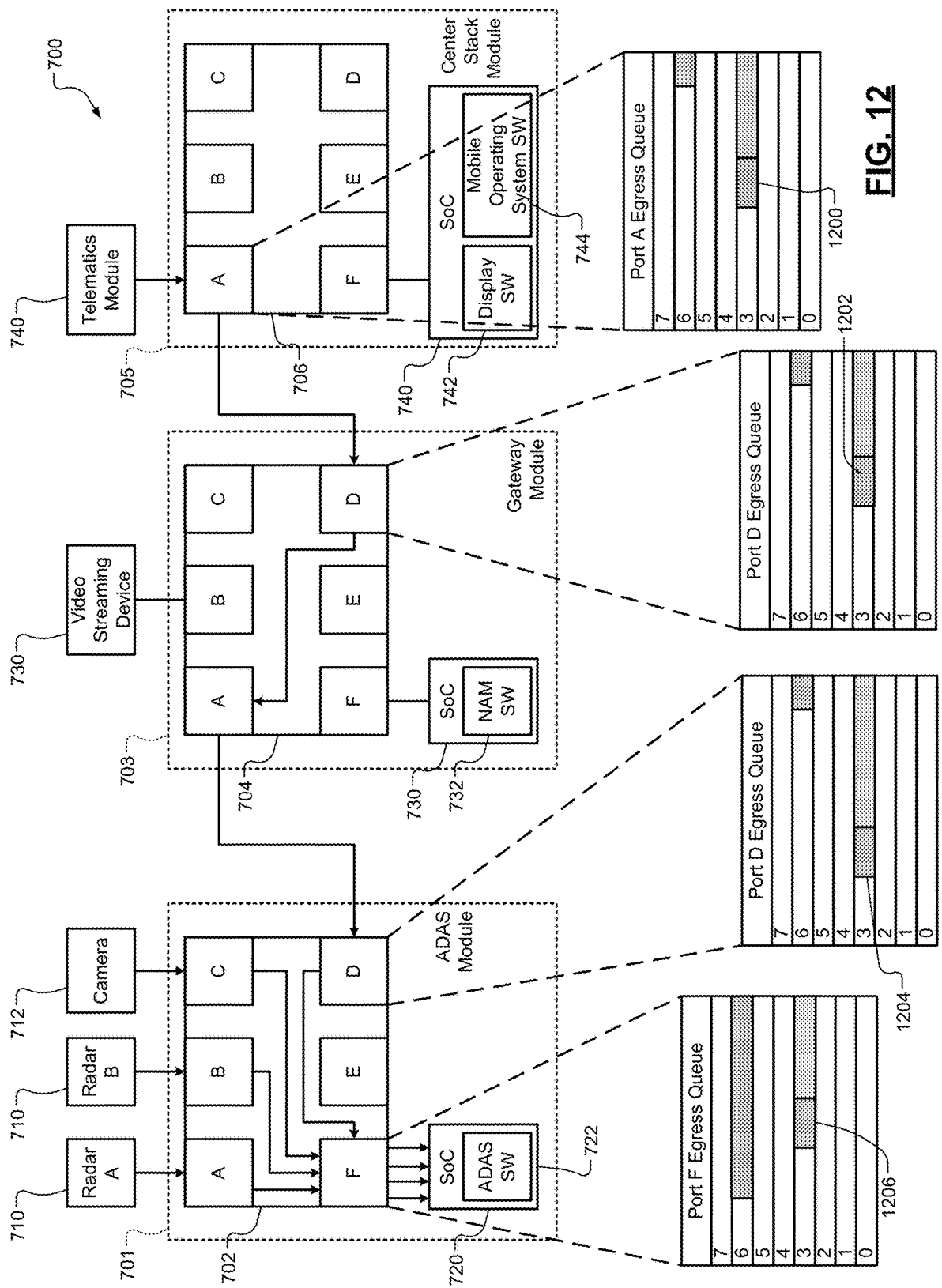
FIG. 12 is a functional block diagram of the Ethernet network of FIG. 7 illustrating transmission of frames for an endpoint contention example based on the quality of service request and in accordance with the present disclosure.

Continuing with the example of FIG. 11, FIG. 12 shows the endpoint contention example of the Ethernet network 700 including the modules 701, 703, 705, Ethernet switches 702, 704, 706, devices 710, 712, 720, 730, 732, 740 and 742 and software 722, 734, 744, and 746. The ports of the Ethernet switches 702, 704, 706 include respective sets of queues. FIG. 12 shows the data bars 1200, 1202, 1204, 1206 associated with the data being transmitted from the telematics module 740 according to the default priority level due to the elevation request being denied.

In the above-described examples, frames may be transmitted the transmitting feature module or device directly to the receiving feature module via Ethernet ports or may indirectly via one of the NAMs and the Ethernet ports. The NAM may forward frames based on the identification information and/or other content of the frames as described herein.

FIG. 13 shows a dynamic prioritization and resource allocation method including a method of operating a network access module. Although the following operations are primarily described with respect to the implementations of FIGS. 1-2 and 6, the operations may be easily modified to apply to other implementations of the present disclosure. The operations may be iteratively performed. The method may begin at 1300. At 1302, the NAM 600 may receive a priority QoS request message from a requesting feature module for an elevated priority level as described above. The requesting feature module may request an elevated priority level. The request may be associated with, for example, a critical condition for which elevated priority is appropriate.

At 1304, the NAM 600 may receive sensor data including any of the sensor data referred to herein. At 1306, the NAM 600 may receive and/or access other condition and environment status information. This may include information from devices remotely located away from the vehicle of the NAM 600, information stored in memory and/or other related information.

At 1308, the port and queue monitoring module 608 may receive port status and/or queue status signals. These signals may indicate data traffic rates of ports and fill levels of queues of ports of Ethernet switches in the corresponding Ethernet network. In one embodiment, the signals may only indicate data traffic rates of ports and fill levels of queues that may be used for transmission of data and/or a message from the requesting feature module.

At 1310, the NAM 600 may determine default priority levels of the requesting feature module, corresponding application being implemented by the request feature module, data being transmitted, and/or messages being transferred. The NAM 600 may also determine default priority levels of other feature modules, applications, data and/or messages being transferred in relevant ports of Ethernet switches.

At 1312, the feature prioritization module 604 may evaluate the collected data and/or information to determine whether an elevated priority level for the requesting feature module, corresponding application, data being transmitted and/or messages being transmitted is appropriate and what is the appropriate level. The data and/or messages may be transmitted as frames. The type of the frame may be determined. This may include determining whether the frame is associated with safety, GPS, infotainment, sensor data, image data, wireless communication, Internet, vehicle-to-vehicle communication, etc. Default priority levels may be associated with the different types of frames, vehicle conditions, operating environments, business criteria, etc. Different businesses and/or vehicle manufacturers may have different criterion for setting priority levels. At 1313, the resource allocation module 606 may determine the resources, such as the queues associated with the determined appropriate priority level. This may include obtaining the information to include in a response message generated at 1316 or 1318.

At 1314, the feature prioritization module 604 determines whether an elevated priority level is appropriate. If an elevated priority level is appropriate, operation 1316 is performed, otherwise operation 1318 is performed.

At 1316, the NAM 600 generates and sends a priority QoS response signal to the requesting feature module to have data and/or messages transmitted across one or more Ethernet switches at an elevated priority. As an example this data and/or messages may be sent such that operations associated with the data and/or messages can be quickly performed. Certain important information is able to be displayed more quickly, such as for example views of areas external to the vehicle. This advantage also applies to the example of FIGS. 8-9.

At 1318, the NAM 600 generates and sends a priority QoS response signal to the requesting feature module indicating elevated priority level request denied and/or indicating information for transferring the data and/or messages via queues associated with default priority level. The NAM grants priority to the requesting feature module by allowing the requesting feature module to use one or more queues of one or more ports with an elevated priority. The method may end at 1320.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples include a method for dynamically setting Ethernet QoS priority levels and allocating resources for improved Ethernet network performance during critical or high priority conditions. The method includes a central priority module, queues, and software configured to request priority across a distributed system having a distributed switch topology. As shown above, there are different variations of vehicle conditions that can affect how important traffic is on an Ethernet network and contention can exist near a feature module or device and/or distributed across the system. Implementing QoS operations for automotive Ethernet as disclosed herein provides a method for dynamically prioritizing Ethernet messages based on (i) vehicle conditions, (ii) operating environments, (iii) data, messages and/or frames being transferred, and/or (iv) other criteria and/or status information.

The adaptive Ethernet network configuration disclosed herein provides real-time (as situations occur) Ethernet prioritization (QoS) based upon criteria and status information. The prioritization is adapted based on real-time status information. As an example, an active safety feature module may encounter a situation where off-board data from a station remotely located away from the corresponding vehicle is needed quickly. A NAM as disclosed herein is able to change prioritization in real-time to provide the off-board data a highest priority level until the high priority level situation passes. The Ethernet network configuration provides feature modules (e.g., active safety feature module, infotainment feature module, etc.) the tools needed to provide a safer and more responsive vehicle system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, switches, feature modules, devices, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. For example, a feature module may be directly connected to a port of a first Ethernet switch or indirectly connected to the port of the Ethernet switch via one or more other Ethernet switches. Similarly, a first Ethernet switch may be directly connected to a port of a second Ethernet switch or indirectly connected to the port of the second Ethernet switch via one or more other Ethernet switches. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for transferring a frame within an Ethernet network of a vehicle, the system comprising:
   an Ethernet switch comprising a plurality of ports, wherein the plurality of ports comprise a first port and a second port, wherein the first port comprises a plurality of queues;
   a first feature module connected to the first port;
   a second feature module connected to the second port; and
   a network access module implemented at the Ethernet switch or the first feature module, the network access module configured to
      receive a priority request message generated by the second feature module,
      generate a priority response message indicating information for the second feature module to set a priority level of the frame, and
      transmit the priority response message to the second feature module,
   wherein the Ethernet switch is configured to
      receive the frame, via the second port, from the second feature module at the first port, wherein the frame has a first one or more bits indicative of the priority level and a second one or more bits indicative of a port at the first feature module, and
      forward the frame, based on the first one or more bits and the second one or more bits, to a corresponding one of the plurality of queues having the priority level and for transmission to the port at the first feature module.

2. The system of claim 1, wherein the network access module configured to determine a type of the frame and changes the priority level of the frame based on at least one of a traffic level of data in the first port or a fill level of one or more of the plurality of queues.

3. The system of claim 1, wherein the network access module is configured to determine a type of the frame and changes the priority level of the frame based on a business criterion.

4. The system of claim 1, wherein the network access module is configured to determine a type of the frame and changes a priority level of the frame based on at least one of a vehicle condition or an operating environment of the vehicle.

5. The system of claim 1, wherein:
the priority level of the frame is set by the second feature module based on the information received from the network access module; and
the Ethernet switch is configured to, based on the priority level of the frame, determine whether to forward the frame prior to forwarding another frame.

6. A system for transferring a frame within an Ethernet network of a vehicle, the system comprising:
an Ethernet switch comprising a plurality of ports, wherein the plurality of ports comprise a first port and a second port, wherein the first port comprises a plurality of queues;
a first feature module connected to the first port;
a second feature module connected to the second port; and
a network access module separate from the Ethernet switch, the first feature module and the second feature module and configured to
receive a priority request message from the second feature module in the vehicle,
generate a priority response message indicating information for the second feature module to set a priority level of a frame, and
transmit the priority response message to the second feature module,
the Ethernet switch is configured to
receive the frame, via the second port, from the second feature module at the first port, wherein the frame has a first one or more bits indicative of the priority level and a second one or more bits indicative of a port at the first feature module, and
forward the frame, based on the first one or more bits and the second one or more bits, to a corresponding one of the plurality of queues having the priority level and for transmission to the port at the first feature module.

7. The system of claim 6, wherein the network access module configured to determine a type of the frame and changes the priority level of the frame based on a traffic level of data in the first port.

8. The system of claim 6, wherein the network access module is configured to determine a type of the frame and changes the priority level of the frame based on a fill level of one or more of the plurality of queues.

9. The system of claim 6, wherein the network access module is configured to determine a type of the frame and changes the priority level of the frame based on a business criterion.

10. The system of claim 6, wherein the network access module is configured to determine a type of the frame and changes a priority level of the frame based on at least one of a vehicle condition or an operating environment of the vehicle.

11. The system of claim 6, wherein:
the Ethernet switch comprises a third port; and
the network access module is connected to the third port.

12. The system of claim 6, wherein the network access module is implemented by the first feature module, the second feature module or the Ethernet switch.

13. A system for transferring a frame within an Ethernet network of a vehicle, the system comprising:

a first Ethernet switch comprising a plurality of ports, wherein the plurality of ports comprise a first port and a second port, wherein the first port comprises a plurality of queues;
a second Ethernet switch connected to the first port;
a first feature module connected to the first port or the second Ethernet switch;
a second feature module directly or indirectly connected to the second port, and
a network access module configured to
receive a priority request message from the first feature module within the vehicle,
generate a priority response message indicating information for the first feature module to set a priority level of the frame, and
transmit the priority response message to the first feature module,
wherein the first Ethernet switch is configured to
receive the frame from the first feature module at the first port, wherein the frame has a first one or more bits indicative of the priority level and a second one or more bits indicative of a port at a second feature module, and
forward the frame, based on the first one or more bits and the second one or more bits, to a corresponding one of the plurality of queues having the priority level and for transmission to the port at the second feature module.

14. The system of claim 13, wherein the network access module configured to determine a type of the frame and changes the priority level of the frame based on a traffic level of data in the first port.

15. The system of claim 13, wherein the network access module is configured to determine a type of the frame and changes the priority level of the frame based on a fill level of one or more of the plurality of queues.

16. The system of claim 13, wherein the network access module is configured to determine a type of the frame and changes the priority level of the frame based on a business criterion.

17. The system of claim 13, wherein the network access module is configured to determine a type of the frame and changes a priority level of the frame based on at least one of a vehicle condition or an operating environment of the vehicle.

18. The system of claim 13, wherein: the first feature module is connected to the second port.

19. The system of claim 13, wherein: the first feature module is connected to the second Ethernet switch.

20. The system of claim 13, wherein:
the first Ethernet switch comprises a third port; and
the network access module is connected to the third port.

21. The system of claim 13, wherein the network access module is implemented by the first feature module, the second feature module, the first Ethernet switch or the second Ethernet switch.

22. The system of claim 13, wherein the first Ethernet switch is configured to:
receive the frame from the first feature module, via the second port, at the first port; and
forward the frame to the second Ethernet switch.

* * * * *